United States Patent
Nakano

(10) Patent No.: US 12,067,747 B2
(45) Date of Patent: Aug. 20, 2024

(54) CAMERA PARAMETER CALCULATION APPARATUS, CAMERA PARAMETER CALCULATION METHOD, AND NON-TRANSITORY COMPUTER READABLE MEDIUM STORING PROGRAM

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 17/437,983

(22) PCT Filed: Mar. 20, 2019

(86) PCT No.: PCT/JP2019/011764
§ 371 (c)(1),
(2) Date: Sep. 10, 2021

(87) PCT Pub. No.: WO2020/188799
PCT Pub. Date: Sep. 24, 2020

(65) Prior Publication Data
US 2022/0180560 A1 Jun. 9, 2022

(51) Int. Cl.
*G06T 7/80* (2017.01)
*G06T 3/40* (2006.01)

(52) U.S. Cl.
CPC ............... *G06T 7/80* (2017.01); *G06T 3/40* (2013.01); *G06T 2207/20076* (2013.01)

(58) Field of Classification Search
CPC .. G06V 40/161; G06V 10/32; G06T 2200/04; G06T 7/80
See application file for complete search history.

(56) References Cited

U.S. PATENT DOCUMENTS

2006/0215031 A1 9/2006 Krahnstoever et al.
2013/0002871 A1* 1/2013 Natroshvili ............... G06T 7/80
348/148
(Continued)

FOREIGN PATENT DOCUMENTS

JP 2013003970 A * 1/2013
JP 6011548 B2 10/2016

OTHER PUBLICATIONS

Burger et al., Zhang's Camera Calibration Algorithm: In-Depth Tutorial and Implementation, 2016, Report No. HGB16-05, pp. 1-56, DOI:10.13140/RG.2.1.1166.1688/1.*

(Continued)

*Primary Examiner* — Guillermo M Rivera-Martinez

(57) ABSTRACT

In a camera calibration apparatus (10), an external parameter calculation unit (13) calculates a rotation vector and a rotation matrix using the normalized start point coordinates, the normalized end point coordinates, and an "evaluation function" obtained by the normalized coordinate transformation unit (12) for each normal vector in the image plane and then outputs the calculated translation vector and rotation matrix. The normal vectors in the image plane respectively correspond to a plurality of normal vectors in a world coordinate space with respect to a reference plane in the world coordinate space. The evaluation function is for overdetermining a rotation parameter around a normal line with respect to the above reference plane in the world coordinate space.

12 Claims, 9 Drawing Sheets

(56) References Cited

U.S. PATENT DOCUMENTS

| | | | |
|---|---|---|---|
| 2015/0029345 A1* | 1/2015 | Ikeda | G06T 7/80 348/187 |
| 2015/0029346 A1 | 1/2015 | Ikeda | |
| 2017/0243374 A1* | 8/2017 | Matsuzawa | G06T 7/80 |

OTHER PUBLICATIONS

Horn et al., Tsai's camera calibration method revisited, 2000, pp. 1-13, //people. csail. mit. edu/bkph/articles/Tsai_Revisited.*

Cho et al., A new robust 3D motion estimation under perspective projection, Proceedings 2001 International Conference on Image Processing (Cat. No. 01CH37205), Thessaloniki, Greece, 2001, pp. 660-663 vol. 3, doi: 10.1109/ICIP.2001.958205.*

Abdellali et al., Absolute and Relative Pose Estimation of a Multi-View Camera System using 2D-3D Line Pairs and Vertical Direction, 2018 Digital Image Computing: Techniques and Applications (DICTA), Canberra, ACT, Australia, 2018, pp. 1-8, doi: 10.1109/DICTA.2018.8615792.*

Frohlich et al.,Absolute Pose Estimation of Central Cameras Using Planar Regions, in IEEE Transactions on Pattern Analysis and Machine Intelligence, vol. 43, No. 2, pp. 377-391, Feb. 1, 2021, doi: 10.1109/TPAMI.2019.2931577.*

Miraldo et al., Calibration of Smooth Camera Models, IEEE Transactions on Pattern Analysis and Machine Intelligence, vol. 35, No. 9, Sep. 2013, pp. 2091-2103, doi: 10.1109/TPAMI.2012.258.*

Kannala at al., Geometric Camera Calibration, Wiley Encyclopedia of Computer Science and Engineering, B.W. Wah (Ed.), Jun. 2008, pp. 1-20, doi.org/10.1002/9780470050118.ecse589.*

International Search Report for PCT Application No. PCT/JP2019/011764, mailed on May 28, 2019.

* cited by examiner

CAMERA PARAMETER CALCULATION APPARATUS, CAMERA PARAMETER CALCULATION METHOD, AND NON-TRANSITORY COMPUTER READABLE MEDIUM STORING PROGRAM

This application is a National Stage Entry of PCT/JP2019/011764 filed on Mar. 20, 2019, the contents of all of which are incorporated herein by reference, in their entirety.

TECHNICAL FIELD

The present disclosure relates to a camera calibration apparatus, a camera calibration method, and a non-transitory computer readable medium storing a program.

BACKGROUND ART

In order to perform a three-dimensional image analysis using a multi-viewpoint camera system composed of a plurality of cameras, it is necessary to clarify optical characteristics of the cameras and the positional relationship between the cameras. The optical characteristics are parameters unique to each camera, for example, a focal length, lens distortion, optical center coordinates, etc., and are collectively referred to as "internal parameters". The internal parameters are invariant unless a zoom value is changed or a lens of the camera is replaced with a different lens. The parameters representing the positional relationship between the cameras refer to a rotation matrix and a translation vector and are referred to as "external parameters". The external parameters are invariant as long as the camera is not moved relative to an origin of three-dimensional coordinates. If these internal and external parameters are known, size and length of a subject in an image can be converted into a physical distance (e.g., meters), and a three-dimensional shape of the subject can be restored. Calculating one or both of these internal and external parameters is referred to as "camera calibration". Also, one of the internal parameters and the external parameters may be simply referred to as "camera parameters" or both of them may be simply referred to as "camera parameters" without distinguishing between the internal parameters and the external parameters.

A method of calibrating a camera with known internal parameters is also referred to as the Perspective-N-Point (PnP) problem. As methods for solving the PnP problem, various methods have been proposed (e.g., Patent Literature 1). In the technique disclosed in Patent Literature 1, a line segment perpendicular to a horizontal plane is detected from an image, a plurality of the detected vertical line segments are projected on a virtual plane, and a rotation matrix is calculated using an evaluation function for minimizing parallelism of each line segment on the virtual plane.

CITATION LIST

Patent Literature

Patent Literature 1: Japanese Patent No. 6011548

SUMMARY OF INVENTION

Technical Problem

The present inventor has found that in the technique disclosed in Patent Literature 1, there is a possibility that the number of unknown variables may increase as the number of observation line segments increases in the minimization of the evaluation function, resulting in a so-called underdetermination problem. In the case of an underdetermination problem, even if the number of line segments to be observed is increased, the number of constraint formulas is always insufficient. Since there are infinite theoretical optimum solutions, even camera parameters that are impossible in reality become optimum solutions. That is, the accuracy of the calculated external parameter may deteriorate.

An object of the present disclosure is to provide a camera calibration apparatus, a camera calibration method, and a non-transitory computer readable medium storing a program which can accurately calculate an external parameter.

Solution to Problem

A first example aspect is a camera calibration apparatus including:
  an acquisition unit configured to acquire a plurality of normal vectors in an image plane corresponding to a plurality of normal vectors in a world coordinate space with respect to a reference plane in the world coordinate space, in the image plane of an image obtained by photographing the world coordinate space using a camera;
  a normalized coordinate transformation unit configured to transform start point coordinates in the image plane and end point coordinates in the image plane, the start point coordinates in the image plane and the end point coordinates in the image plane being coordinates in the image plane, for a start point and an end point of each normal vector in the image plane acquired by the acquisition unit into normalized start point coordinates and normalized end point coordinates, the normalized start point coordinates and the normalized end point coordinates being normalized coordinates based on internal parameters of the camera; and
  an external parameter calculation unit configured to calculate a translation vector and a rotation matrix for the camera using the normalized start point coordinates and the normalized end point coordinates obtained for each normal vector in the image plane by the normalized coordinate transformation unit and an evaluation function for overdetermining a rotation parameter around a normal line with respect to the reference plane in the world coordinate space.

A second example aspect is a camera calibration method including:
  acquiring a plurality of normal vectors in an image plane corresponding to a plurality of normal vectors in a world coordinate space with respect to a reference plane in the world coordinate space, in the image plane of an image obtained by photographing the world coordinate space using a camera;
  transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and
  calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

A third example aspect is a non-transitory computer readable medium storing a program storing a program causing a camera calibration apparatus to execute processing of:

acquiring a plurality of normal vectors in an image plane corresponding to a plurality of normal vectors in a world coordinate space with respect to a reference plane in the world coordinate space, in the image plane of an image obtained by photographing the world coordinate space using a camera;

transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

Advantageous Effects of Invention

According to the present disclosure, it is possible to provide a camera calibration apparatus, a camera calibration method, and a non-transitory computer readable medium storing a program which can accurately calculate an external parameter.

DESCRIPTION OF EMBODIMENTS

Example embodiments will be described below with reference to the drawings. In the example embodiments, the same or equivalent elements are denoted by the same reference signs, and repeated description is omitted.

First Example Embodiment

Figure 1:
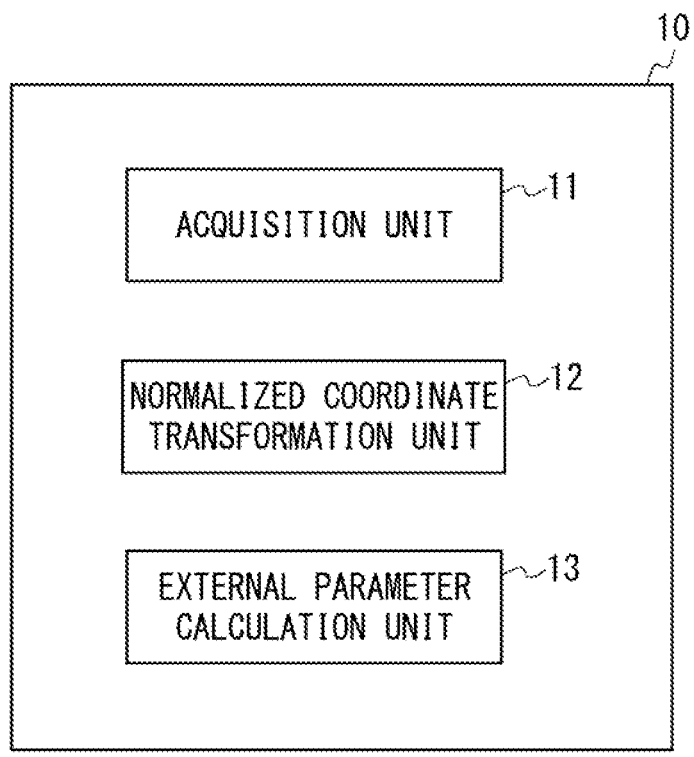
FIG. 1 is a block diagram showing an example of a camera calibration apparatus according to a first example embodiment.

FIG. 1 is a block diagram showing an example of a camera calibration apparatus according to a first example embodiment. In FIG. 1, a camera calibration apparatus 10 includes an acquisition unit 11, a normalized coordinate transformation unit 12, and an external parameter calculation unit 13.

The acquisition unit 11 acquires a plurality of "normal vectors in an image plane" in the "image plane" of an image obtained by photographing the "world coordinate space" by a camera (not shown). The plurality of "normal vectors in the image plane" respectively correspond to a plurality of "normal vectors in a world coordinate space" with respect to a "reference plane" in the "world coordinate space". The "world coordinate space" is a space defined by a world coordinate system. The "reference plane" may be, for example, a horizontal plane such as the ground or floor. The "normal vector in the world coordinate space" may be, for example, a side such as a building or a shelf extending perpendicularly to the above horizontal plane. A start point and an end point of the normal vector in the world coordinate space may or may not be on the reference plane.

The normalized coordinate transformation unit 12 transforms "start point coordinates in the image plane" and "end point coordinates in the image plane", which are coordinates in the image plane for the start point and the end point of each normal vector in the image plane acquired by the acquisition unit 11, into normalized start point coordinates and normalized end point coordinates, which are normalized coordinates, based on the internal parameters of the camera (not shown). Here, the internal parameters of the camera (not shown) are known and can be acquired by the normalized coordinate transformation unit 12.

The external parameter calculation unit 13 calculates a translation vector and a rotation matrix using the normalized start point coordinates, the normalized end point coordinates, and an "evaluation function" and then outputs the calculated translation vector and rotation matrix, the normalized start point coordinates and the normalized end point coordinates being obtained by the normalized coordinate transformation unit 12 for each normal vector in the image plane. Here, the "evaluation function" is a function that overdetermines a rotation parameter around a normal line with respect to the above "reference plane" in the world coordinate space.

As described above, according to the first example embodiment, in the camera calibration apparatus 10, the external parameter calculation unit 13 calculates the rotation vector and the rotation matrix using the normalized start point coordinates, the normalized end point coordinates, and the "evaluation function" and then outputs the calculated rotation vector and the rotation matrix, the normalized start point coordinates and the normalized end point coordinates being acquired for each normal vector in the image plane by the normalized coordinate transformation unit 12. The "evaluation function" is a function that overdetermines the rotation parameter about the normal line with respect to the "reference plane" in the world coordinate space.

According to the configuration of the camera calibration apparatus 10, it is possible to calculate an external parameter while avoiding an underdetermination problem. Thus, the external parameter can be accurately calculated.

Second Example Embodiment

A second example embodiment relates to a more specific example embodiment.

<Overview of Camera System>

Figure 2:
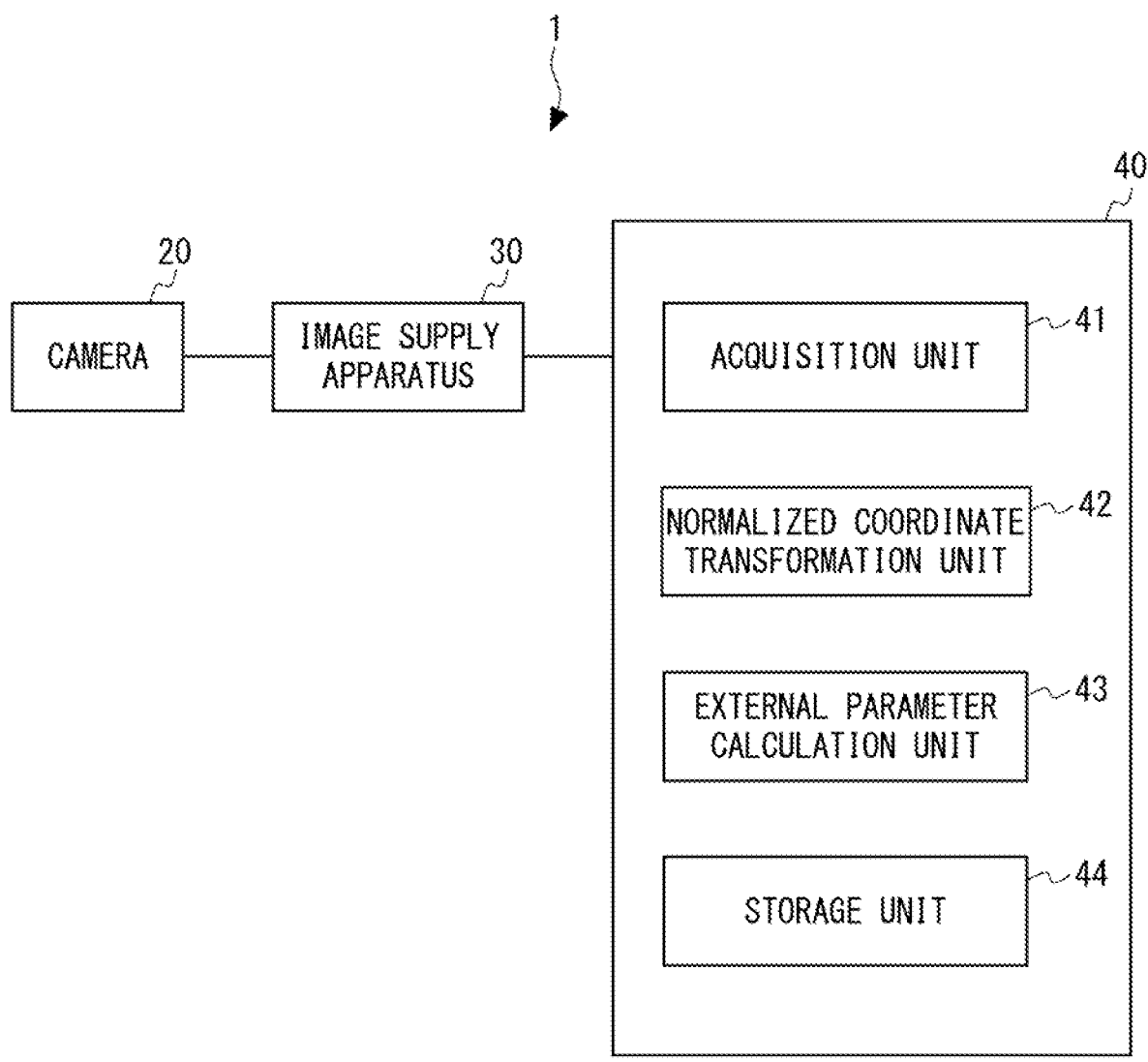
FIG. 2 is a block diagram showing an example of a camera system according to a second example embodiment.

FIG. 2 is a block diagram showing an example of a camera system according to the second example embodiment. In FIG. 2, the camera system 1 includes a camera 20, an image supply apparatus 30, and a camera calibration apparatus 40.

The camera 20 photographs a photographing target area in the "world coordinate system" to form an image P1.

Figure 3:
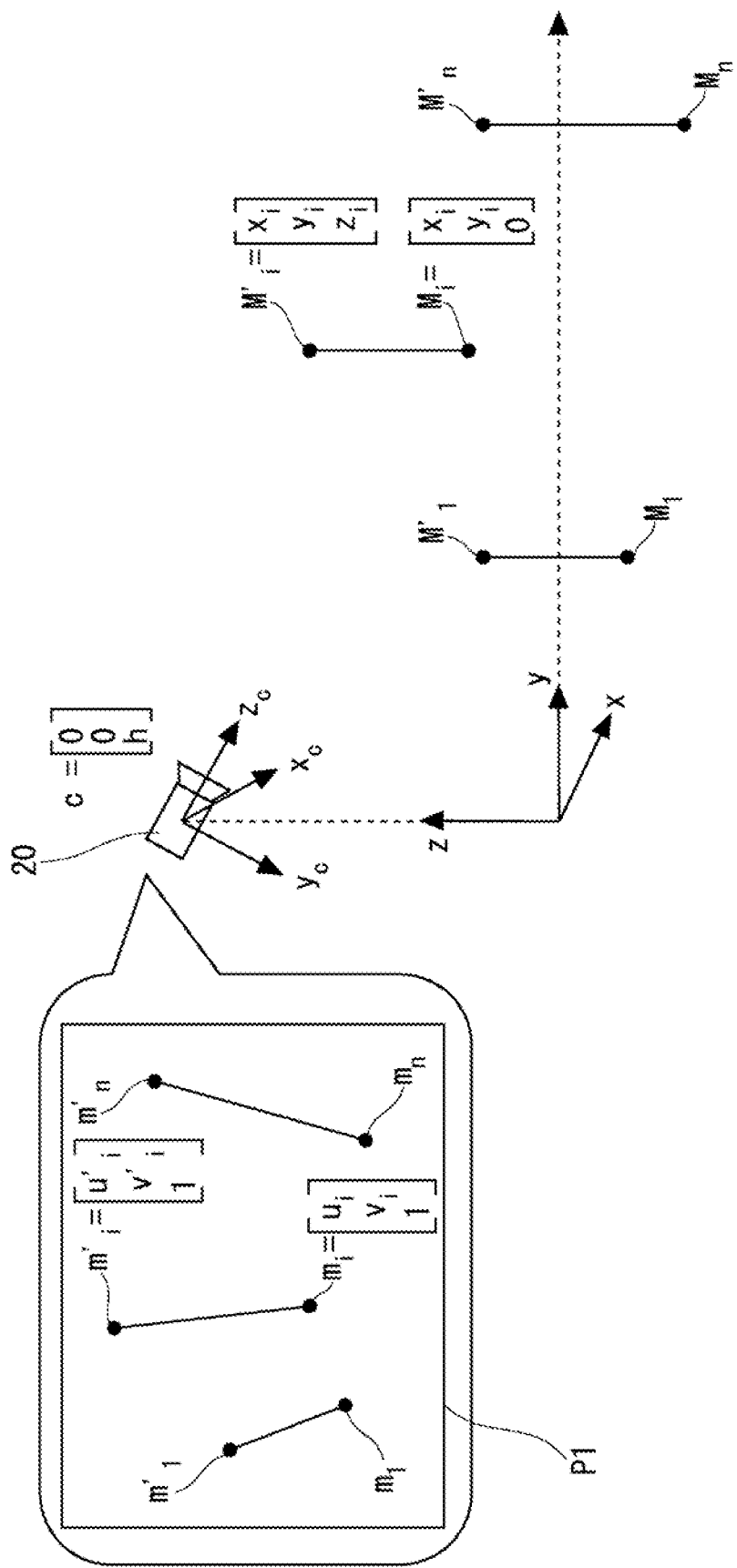
FIG. 3 is a diagram for explaining a relationship between a camera coordinate system and a world coordinate system.

The relationship between the "camera coordinate system" of the camera 20 and the "world coordinate system" will now be described. FIG. 3 is a diagram for explaining the relationship between the camera coordinate system and the world coordinate system.

In FIG. 3, an origin of the camera coordinate system is located on a z axis of the world coordinate system and has coordinates [0, 0, h] of the world coordinate system (=c). That is, the position of the camera 20 can be expressed by one dimension of a z coordinate of the world coordinate system, and a translation vector T for the camera 20 can also be expressed with a small parameter of one dimension.

A $z_c$ axis of the camera coordinate system corresponds to an optical axis of the camera 20. A projection of the $z_c$ axis on an xy plane of the world coordinate system overlaps a y axis of the world coordinate system. That is, when viewed from a +z direction of the world coordinate system, the $z_c$ axis of the camera coordinate system and the y axis of the world coordinate system overlap each other. That is, a yaw rotation (i.e., rotation around a $y_c$ axis.) of the camera 20 is limited. Thus, the rotation matrix of the camera 20 can be expressed in two dimensions of roll rotation (rotation around the $z_c$ axis) and pitch rotation (rotation around an $x_c$ axis), and a rotation matrix R of the camera 20 can also be expressed in a small number of parameters of two dimensions.

In this example embodiment, since the three-dimensional coordinates of the world coordinate system are not explicitly given, the world coordinate system and the camera coordinate system may be freely defined. Therefore, as shown in FIG. 3, the generality is not lost even if the world coordinate system and the camera coordinate system are set.

Returning to the description of FIG. 2, the image supply apparatus 30 acquires an image formed by the camera 20, and supplies the acquired image to the camera calibration apparatus 40. For example, the image supply apparatus 30 may transmit the acquired image to the camera calibration apparatus 40 via a communication unit (not shown). The image may be a single still image at a certain time, each frame image of a continuous moving image of time series, or a plurality of still images of different time series.

<Configuration Example of Camera Calibration Apparatus>

In FIG. 2, the camera calibration apparatus 40 includes an acquisition unit 41, a normalized coordinate transformation unit 42, an external parameter calculation unit 43, and a storage unit 44.

The acquisition unit 41 acquires the plurality of "normal vectors in the image plane" in the "image plane" of the image supplied from the camera calibration apparatus 40. For example, in the image supplied from the camera calibration apparatus 40, the acquisition unit 41 may automatically acquire, by image processing, line segments of an artifact, such as a building or a box, which are perpendicular to or in contact with the ground. Alternatively, the acquisition unit 41 may automatically acquire a backbone joint in each frame image as a normal vector by combining tracking of a specific person and the joint detection in the moving image supplied from the camera calibration apparatus 40. Further alternatively, the acquisition unit 41 may accept designation of the "normal vector in the image plane" for the image supplied from the camera calibration apparatus 40 by a user's manual input. The lengths in the world coordinate space of the plurality of "normal vectors in the world coordinate space" corresponding to the plurality of acquired normal vectors in the image plane may be different from each other. As described above, the start point and the end point of the normal vector in the world coordinate space may or may not be on the reference plane. In the example shown in FIG. 3, the start point of the normal vector in the world coordinate space is on the reference plane.

The normalized coordinate transformation unit 42, similarly to the normalized coordinate conversion unit 12 according to the first embodiment, transforms the "start point coordinates in the image plane" and the "end point coordinates in the image plane", which are coordinates in the image plane for the start point and the end point of each normal vector in the image plane acquired by the acquisition unit 41, into the normalized start point coordinates and the normalized end point coordinates, respectively, which are normalized coordinates, based on the internal parameters of the camera 20. The "internal parameters" of the camera 20 are stored in the storage unit 44 in advance. Here, the normalized coordinate transformation unit 42 homogenizes the "start point coordinates in the image plane" and the "end point coordinates in the image plane". Specifically, the "start point coordinates in the image plane" and the "end point coordinates in the image plane" are three-dimensionally homogenized as indicated by $m_i$ and $m_i'$ in FIG. 3. That is, the "start point coordinates in the image plane" and the "end point coordinates in the image plane" are represented by three-dimensional coordinates obtained by adding uncertainty of scale to two-dimensional image coordinates.

In a manner similar to the external parameter calculation unit 13 according to the first example embodiment, the external parameter calculation unit 43 calculates a translation vector and a rotation matrix using the normalized start point coordinates, the normalized end point coordinates, and an "evaluation function" and then outputs the calculated translation vector and rotation matrix, the normalized start point coordinates and the normalized end point coordinates being obtained by the normalized coordinate transformation unit 12 for each normal vector in the image plane.

For example, the external parameter calculation unit 43 calculates, for the plurality of normal vectors in the image plane, a scalar triple product, which is an inner product of a cross product of a vector of the normalized start point coordinates and a vector of the normalized end point coordinates obtained for each normal vector in the image plane by the normalized coordinate transformation unit 42 and the rotation vector around the $z_c$ axis in the rotation matrix for the camera 20. Then, the external parameter calculation unit 43 calculates a desired rotation vector around the $z_c$ axis, which is expected to minimize a sum of the plurality of calculated scalar triple products using the sum as the evaluation function. The external parameter calculation unit 43 calculates the rotation matrix based on the calculated desired rotation vector around the $z_c$ axis. The external parameter calculation unit 43 outputs the calculated rotation matrix and also outputs the calculated desired rotation vector around the $z_c$ axis as the translation vector for the camera 20. Here, one constraint condition to the rotation vector around the $z_c$ axis is obtained from one normal vector in the image plane. Therefore, the rotation vector around the $z_c$ axis can be calculated by using two or more normal vectors in the image plane. Further, as described above, the rotation angle around the $y_c$ axis can be zero. Since the rotation angle around the $z_c$ axis and the rotation angle around the $x_c$ axis can be estimated from the calculated rotation vector around the $z_c$ axis, the entire 3×3 rotation matrix can be restored. In the relationship between the camera coordinate system and the world coordinate system described with reference to FIG. 3, the translation vector of the camera 20 is equal to a constant factor of the rotation vector around the $z_c$ axis of the rotation matrix. Furthermore, utilizing the fact that the three-dimensional coordinates of the normal vector in the world coordinate space are unknown, the height (z coordinate) of the camera 20 may be set to 1. That is, the translation vector may be calculated as a third column of the rotation matrix. The calculation of the external parameter by the external parameter calculation unit 43 will be described later in detail.

<Operation Example of Camera Calibration Apparatus>

Figure 4:
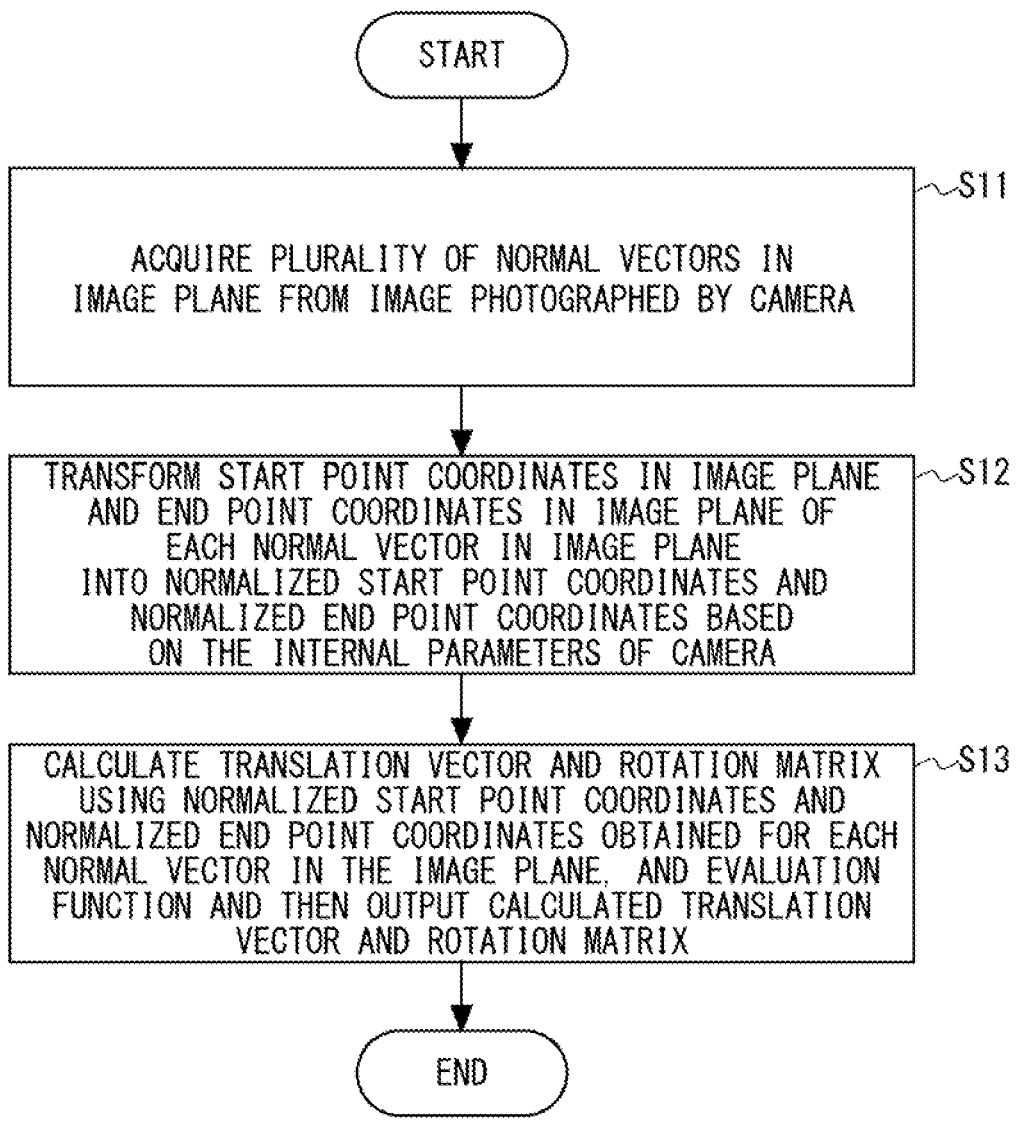
FIG. 4 is a flowchart showing an example of a processing operation of the camera calibration apparatus according to the second example embodiment.

FIG. 4 is a flowchart showing an example of the processing operation of the camera calibration apparatus according to the second example embodiment.

The acquisition unit 41 acquires the plurality of normal vectors in the image plane from the image photographed by the camera 20 (Step S11).

The normalized coordinate transformation unit 42 transforms the start point coordinates in the image plane and end point coordinates in the image plane of each normal vector in the image plane into normalized start point coordinates and normalized end point coordinates based on the internal parameters of the camera 20 (Step S12).

The external parameter calculation unit 43 calculates the translation vector and the rotation matrix using the normalized start point coordinates, the normalized end point coordinates, and the "evaluation function" and then outputs the calculated translation vector and rotation matrix, the normalized start point coordinates and the normalized end point coordinates being obtained for each normal vector in the image plane (Step S13).

Here, the calculation of the external parameter by the external parameter calculation unit 43 will be described in detail using a specific example. In the following description, the symbols shown in FIG. 3 are used. That is, the camera 20 is located at $c=[0, 0, h]^T$ on the z axis of the world coordinate system. The projection of the $z_c$ axis on the xy plane of the world coordinate system overlaps the y axis of the world coordinate system. The start point $M_i=[x_i, y_i, 0]^T$ and the end point $M_i'=[x_i, y_i, z_i]^T$ of the i-th normal vector in the world coordinate space are observed as $m_i=[u_i, v_i, 1]^T$ and $m_i'=[u_i', v_i', 1]^T$ on the image plane, respectively. Here, $m_i$ and $m_i'$ are represented by a homogeneous coordinate system normalized by the internal parameters. A superscript T represents a transposition of a vector or a matrix.

First, the problem to be solved shall be defined.

The rotation matrix R of the camera 20 can be expressed by the following Formula (1) using the rotation angle $\theta_x$ around the $x_c$ axis and the rotation angle $\theta_z$ around the $z_c$ axis, since the rotation angle around the $y_c$ axis can be set to 0 as described above.

[Formula 1]

$$R = \begin{bmatrix} \cos\theta_z & -\sin\theta_z & 0 \\ \sin\theta_z & \cos\theta_z & 0 \\ 0 & 0 & 1 \end{bmatrix} \begin{bmatrix} 1 & 0 & 0 \\ 0 & \cos\theta_x & -\sin\theta_x \\ 0 & \sin\theta_x & \cos\theta_x \end{bmatrix} \quad (1)$$

$$= \begin{bmatrix} \cos\theta_z & -\cos\theta_x\sin\theta_z & \sin\theta_z\sin\theta_x \\ \sin\theta_z & \cos\theta_x\cos\theta_z & -\cos\theta_z\sin\theta_x \\ 0 & \sin\theta_x & \cos\theta_x \end{bmatrix}$$

The translation vector t of the camera 20 can be expressed by the following Formula 2 using the position c of the camera 20 and the rotation matrix R.

[Formula 2]

$$t = -Rc \quad (2)$$

$$= -[r_1, r_2, r_3]\begin{bmatrix} 0 \\ 0 \\ h \end{bmatrix}$$

$$= -hr_3$$

In this formula, $r_j$ represents the vector of the j-th column of the rotation matrix R. That is, Formula 2 shows that the translation vector t is a constant factor of the rotation vector around the $z_c$ axis.

Using the above Formulas (1) and (2), a projection relation between the i-th normal vector in the world coordinate space and the normal vector in the image plane is expressed by the following Formula (3).

[Formula 3]

$$\left.\begin{array}{l} m_i \propto RM_i + t(= RM_i - hr_3) \\ m_i' \propto RM_i' + t(= RM_i' - hr_3) \end{array}\right\} \quad (3)$$

Here, the symbol $\propto$ indicate that the right and left sides have uncertainty by a constant factor.

Here, in this example embodiment, since the world coordinate system can be freely set, the three-dimensional coordinates $x_i$, $y_i$, and $z_i$ ($2 \leq i \leq n$) of the start point and the end point of the normal vector in the world coordinate space and the height h of the camera have uncertainty of the constant factor. That is, unless known information about the world coordinate space (e.g., the length in meters of the normal vector in the world coordinate space) is given, the absolute positional relationship in the world coordinate space is unknown, and only the relative positional relationship is obtained. In other words, the relative magnitude can be freely determined. Therefore, when the height of the camera is h=1, the Formula (3) can be expressed as the following Formula (4).

[Formula 4]

$$m_i \propto RM_i - r_3 \\ m'_i \propto RM'_i - r_3 \} \quad (4)$$

When n normal vectors in the image plane can be obtained from Formula (4), the number of unknown variables is 2+3n (the rotation angle $\theta_x$ around the $x_c$ axis, the rotation angle $\theta_z$ around the $z_c$ axis, and the three-dimensional coordinates $x_i, y_i, z_i$ of the start point and end point of each normal vector in the world space). On the other hand, since the number of conditions obtained from one normal vector in the image plane is four ($u_i, v_i, u'_i, v'_i$), the number of conditions when n normal vectors in the image plane can be obtained is 4n. That is, when n is two or more, the number of conditions exceeds the unknown variables (4n>2+3n), and the problem can be solved.

Next, a method of calculating the rotation matrix R and the translation vector t by solving Formula (4) will be described.

Using projective depths λ and λ', and excluding the uncertainty of both sides of Formula (4), the following Formula (5) is expressed.

[Formula 5]

$$\lambda m_i = RM_i - r_3 \\ \lambda' m'_i = RM'_i - r_3 \} \quad (5)$$

The difference between the upper formula and the lower formula in (5) is expressed by the following Formula (6).

[Formula 6]

$$\lambda' m'_i - \lambda m_i = R(M'_i - M_i) \quad (6)$$
$$= R \begin{bmatrix} 0 \\ 0 \\ z_i \end{bmatrix}$$
$$= z_i r_3$$

Formula (6) shows that the three vectors $m_i, m'_i$, and $r_3$ are linearly dependent on each other. That is, as shown in Formula (7), the scalar triple product of these three vectors is zero.

[Formula 7]

$$(m_i \times m'_i)^T r_3 = 0 \quad (7)$$

Formula (7) is obtained for each normal vector in the image plane.

Therefore, when two normal vectors in the image plane can be obtained, $r_3$ can be calculated using the cross product of the vectors as shown in the following Formula (8).

[Formula 8]

$$\begin{bmatrix} (m_1 \times m'_1)^T \\ (m_2 \times m'_2)^T \end{bmatrix} r_3 = 0 \Rightarrow r_3 = \frac{(m_1 \times m'_1) \times (m_2 \times m'_2)}{\|(m_1 \times m'_1) \times (m_2 \times m'_2)\|} \quad (8)$$

When n normal vectors in the image plane can be obtained, $r_3$ can be calculated by the least squares method shown in the following Formula (9).

[Formula 9]

$$\min_{r_3} \left\| \begin{bmatrix} (m_1 \times m'_1)^T \\ \vdots \\ (m_n \times m'_n)^T \end{bmatrix} r_3 \right\|^2 \quad \text{s.t. } \|r_3\| = 1 \quad (9)$$

As described above, the third column $r_3$ of the rotation matrix R can be calculated.

As shown in Formula (1) above, the third column $r_3$ of the rotation matrix R is explicitly expressed using $\theta_x$ and $\theta_z$. That is, $\theta_x$ and $\theta_z$ can be calculated from each component of $r_3$ using inverse trigonometric functions. Since the rotation matrix R is expressed only by the rotation around the $x_c$ axis and rotation around the $z_c$ axis, if $\theta_x$ and $\theta_z$ can be calculated, all components of the rotation matrix R can be calculated.

Formulas (8) and (9) show that the rotation matrix can be estimated if two or more normal vectors in the image plane can be obtained. Furthermore, even if the number of acquired normal vectors in the image plane increases, the unknown variable is only the third column of the rotation matrix. Formula (9) is a numerically stable linear least squares method, and is more stable as n is larger. Thus, unlike the evaluation function used in Patent Literature 1, if the number of normal vectors in the image plane to be acquired is large, the rotation matrix can be obtained with higher accuracy.

Since the translation vector t is the third column $r_3$ itself of the rotation matrix R, it has already been calculated at the same time as the calculation of the rotation matrix R.

As described above, according to the second example embodiment, in the camera calibration apparatus 40, the external parameter calculation unit 43 calculates, for the plurality of normal vectors in the image plane, a scalar triple product, which is the inner product of the cross product of the vector of the normalized start point coordinates and the vector of the normalized end point coordinates obtained for each normal vector in the image plane by the normalized coordinate transformation unit 42 and the rotation vector around the $z_c$ axis in the rotation matrix for the camera 20. Then, the external parameter calculation unit 43 calculates a desired rotation vector around the $z_c$ axis, which is expected to minimize a sum of the plurality of calculated scalar triple products, as the evaluation function. The external parameter calculation unit 43 calculates the rotation matrix based on the calculated desired rotation vector around the $z_c$ axis. Then, the external parameter calculation unit 43 outputs the calculated rotation matrix and also outputs the calculated desired rotation vector around the $z_c$ axis as the translation vector for the camera 20.

According to the configuration of the camera calibration apparatus 40, it is possible to calculate an external parameter while avoiding an underdetermination problem. Thus, the external parameter can be accurately calculated. In addition, it is possible to calibrate a monocular camera using only image information under a condition where the three-dimensional coordinates are unknown.

Modified Example

The camera system 1 according to the second example embodiment can be modified as follows.

<1> The settings of the world coordinate system and the camera coordinate system are not limited to the above settings. For example, the start point of one normal vector in the world coordinate space may be the origin of the world coordinate system, and another normal vector in the world coordinate space may be located on the x-axis. In this case, $M_1=[0, 0, 0]^T$, $M_1'=[0, 0, z_1]^T$, $M_2=[0, y_2, 0]^T$, $M_1'=[0, y_2, z_2]^T$, and the translation vector t does not become the third column of the rotation matrix. However, since the number of unknown variables does not change, if two or more normal vectors in the image plane can be obtained, a rotation matrix and a translation vector can be obtained. Since different three-dimensional coordinate systems can be matched by rigid transformation, it is a mathematically equivalent problem even if the unknown variable to be solved changes by setting the origin.

<2> The reference plane is not limited to the horizontal plane. For example, a line segment parallel to the floor surface may be defined as a normal vector in the world coordinate space using a wall surface as the reference plane.

<3> The method of expressing the rotation matrix is not limited to Formula (1). For example, a quaternion in which the component around the y-axis is zero may be used.

<4> The method of calculating the third column of the rotation matrix is not limited to Formula (8) or Formula (9). Formulas (8) and (9) are equivalent to finding an intersection of the normal vectors in the image plane, i.e., the vanishing point in the vertical direction. Therefore, various methods of calculating the vanishing point in the vertical direction may be used as an alternative. Formula (9) minimizes so-called algebraic errors, but more sophisticated error analysis methods such as geometric error and Sampson error may be used. In addition, known RANSAC (Random Sample Consensus) and weighted least squares method may be combined with Formulas (8) and (9) to calculate the vanishing point while removing the normal vectors in the image plane with large errors.

<5> The z coordinate of the start point of the normal vector in the world coordinate space is not limited to zero. That is, the normal vector in the world coordinate space does not necessarily have to be in contact with the reference plane. This is because, as shown in the derivation from Formula (6) to Formula (7), the value of the z coordinate is erased, and thus it does not affect Formula (8) and Formula (9).

Third Example Embodiment

A third example embodiment relates to an example embodiment for calculating two three-dimensional coordinates in the world coordinate system for the normalized start point coordinates and the normalized end point coordinates of each normal vector in the image plane based on the normal vector in the image plane, the rotation matrix, and the translation vector. A basic configuration of the camera system according to the third example embodiment is the same as that of the camera system 1 according to the second example embodiment, and thus will be described with reference to FIG. 2. That is, the camera system 1 according to the third example embodiment includes a camera calibration apparatus 50 shown in FIG. 5 in place of the camera calibration apparatus 40.

Configuration Example of Camera Calibration Apparatus

Figure 5:
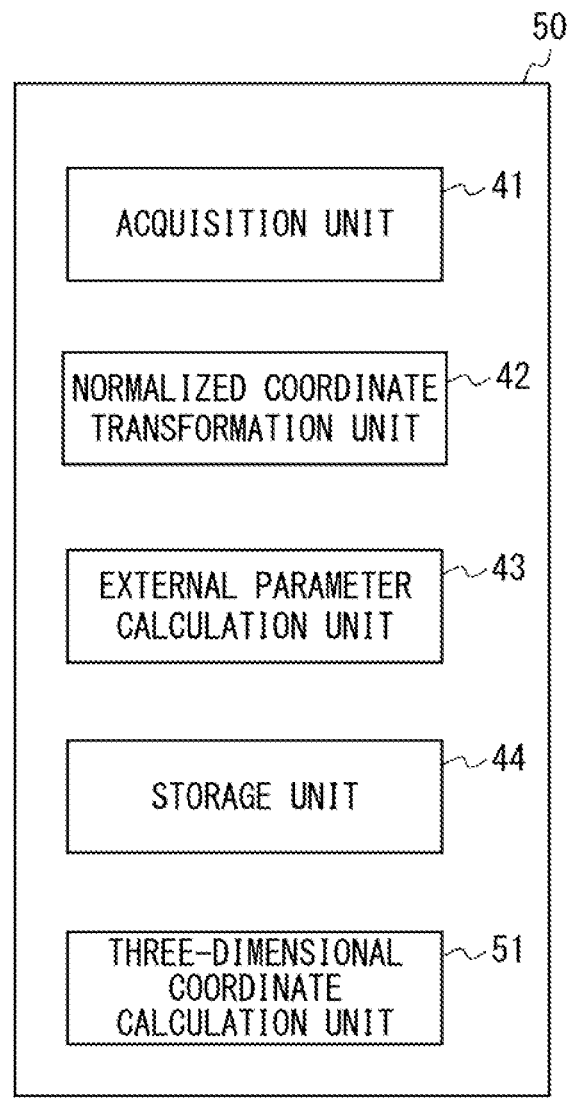
FIG. 5 is a block diagram for explaining a camera calibration apparatus according to a third example embodiment.

FIG. 5 is a block diagram showing an example of the camera calibration apparatus according to the third example embodiment. In FIG. 5, the camera calibration apparatus 50 includes a three-dimensional coordinate calculation unit 51.

The three-dimensional coordinate calculation unit 51 calculates two three-dimensional coordinates in the world coordinate system about normalized start point coordinates and normalized end point coordinates of each normal vector in the image plane based on the plurality of normal vectors in the image plane acquired by the acquisition unit 41, and the rotation matrix and the translation vector calculated by the external parameter calculation unit 43.

The three-dimensional coordinate calculation unit 51 can calculate the above three-dimensional coordinates using the following Formula (10) obtained by deforming Formula (4).

[Formula 10]

$$m_i \times (x_i r_1 + y_i r_2 - r_3) = 0 \quad (10)$$

$$m_i' \times (x_i r_1 + y_i r_2 + z_i r_3 - r_3) = 0$$

$$\Leftrightarrow \begin{bmatrix} m_i \times r_1 & m_i \times r_2 & 0 \\ m_i' \times r_1 & m_i' \times r_2 & m_i' \times r_3 \end{bmatrix} \begin{bmatrix} x_i \\ y_i \\ z_i \end{bmatrix} = \begin{bmatrix} m_i \times r_3 \\ m_i' \times r_3 \end{bmatrix}$$

The vectors $r_1$, $r_2$, and $r_3$ represent column vectors of the above rotation matrix, $m_i$ and $m_i'$ represent the normalized start point coordinates and the normalized end point coordinates of the i-th normal vector in the image plane, and $[x_i, y_i, z_i]$ represents the three-dimensional coordinates to be calculated.

Since Formula (10) is a linear simultaneous formula with $[x_i, y_i, z_i]^T$ as unknown variables, it can be easily solved.

<Operation Example of Camera Calibration Apparatus>

Figure 6:
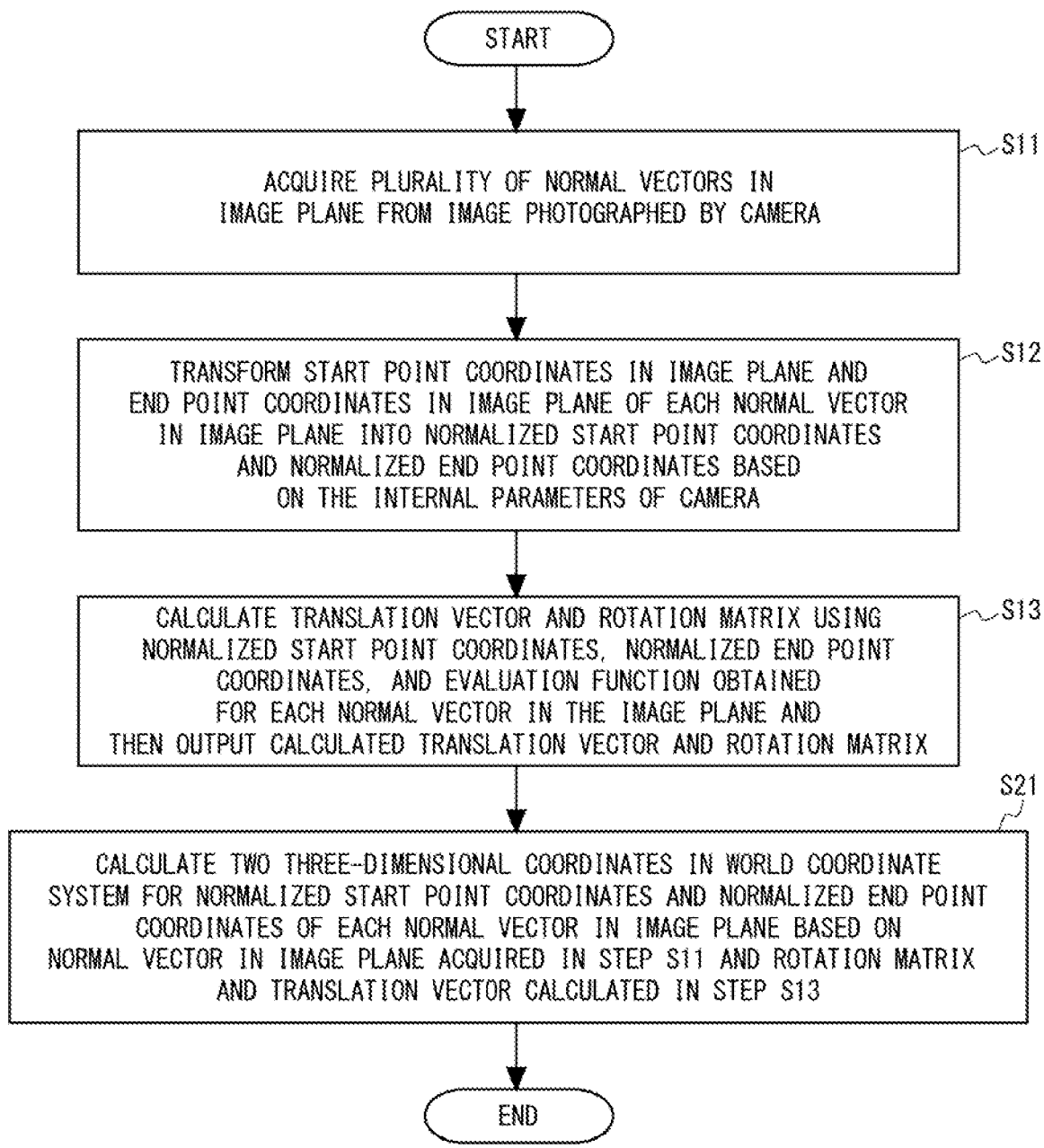
FIG. 6 is a flowchart showing an example of a processing operation of the camera calibration apparatus according to the third example embodiment.

FIG. 6 is a flowchart showing an example of the processing operation of the camera calibration apparatus according to the third example embodiment. In the flowchart of FIG. 6, Steps S11 to S13 are the same as those of the flowchart of FIG. 4.

The three-dimensional coordinate calculation unit 51 calculates two three-dimensional coordinates in the world coordinate system for the normalized start point coordinates and the normalized end point coordinates of each normal vector in the image plane based on the normal vector in the image plane acquired in Step S11 and the rotation matrix and translation vector calculated in Step S13 (Step S21).

Modified Example

The camera system 1 according to the third example embodiment can be modified as follows.

<1> Formula (4) is used to calculate the two three-dimensional coordinates in the world coordinate system for the normalized start point coordinates and the normalized end point coordinates of each normal vector in the image plane, but the present disclosure is not limited to this. For example, the three-dimensional coordinates including the projective depth may be calculated using a formula deformed from Formula (5).

<2> The three-dimensional coordinate calculation unit 51 may calculate absolute three-dimensional coordinates based on the length of the normal vector in the world coordinate space corresponding to at least one of the plurality of normal vectors in the image plane, in addition to the plurality of normal vectors in the image plane, the rotation matrix, and the translation vector, or based on the coordinates on the z-axis of the origin of the camera coordinate system, in addition to the plurality of normal vectors in the image plane, the rotation matrix, and the translation vector. That is, when an absolute length (e.g., in meters) of the normal vector in the world coordinate space corresponding to at least one of the plurality of acquired normal vectors in the image plane is known, the three-dimensional coordinates of the camera position and the normal vector in the world coordinate space, which are relative relations, can be converted into absolute relations using the absolute length. For example, when the z coordinate of the end point of the normal vector in the j-th world coordinate space is known as $z_j=a$, the three-dimensional coordinates of another normal vector in the world coordinate space and the height h of the camera may be multiplied by $a/z_j$. This processing may be executed by the three-dimensional coordinate calculation unit 51 before the three-dimensional coordinate calculation unit 51 receives $z_j=a$ as an input and outputs it, or may be executed as post-processing after the output of the camera calibration apparatus 50.

Fourth Example Embodiment

A fourth example aspect relates to optimization processing for a rotation matrix, a translation vector, and two three-dimensional coordinates about each normal vector in an image plane calculated by a three-dimensional coordinate calculation unit. A basic configuration of a camera system according to a fourth example embodiment related to the is the same as that of the camera system 1 according to the second example embodiment, and thus will be described with reference to FIG. 2. That is, the camera system 1 according to the fourth example embodiment includes a camera calibration apparatus 60 shown in FIG. 7 in place of the camera calibration apparatus 40.

<Configuration Example of Camera Calibration Apparatus>

Figure 7:
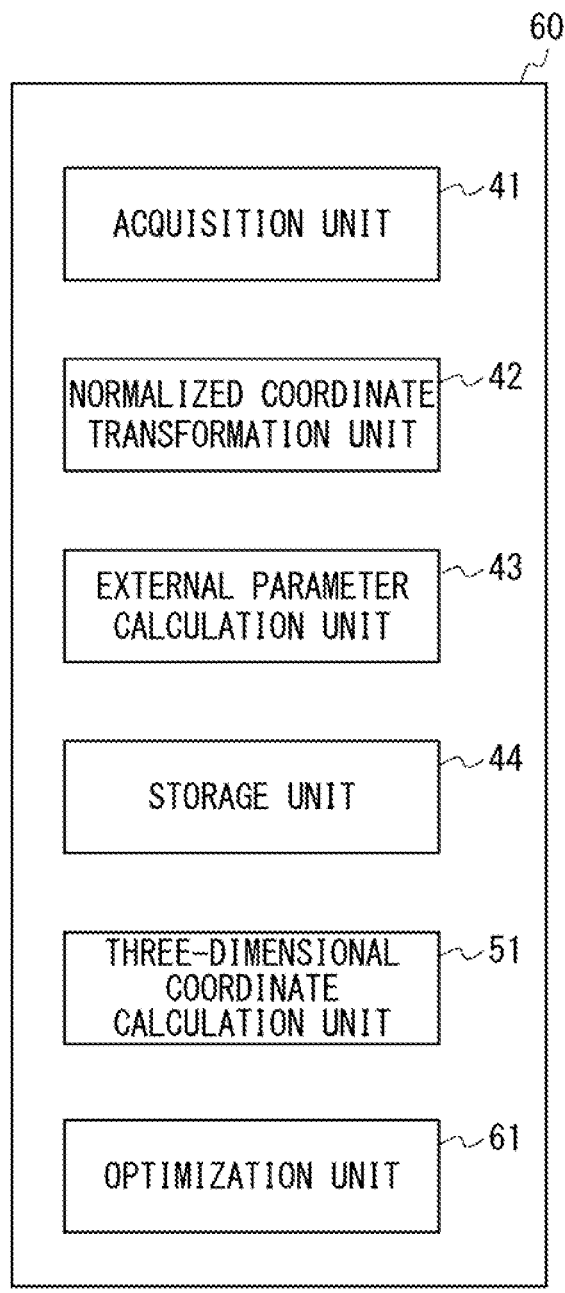
FIG. 7 is a block diagram showing an example of a camera calibration apparatus according to a fourth example embodiment.

FIG. 7 is a block diagram showing an example of the camera calibration apparatus according to the fourth example embodiment. In FIG. 7, the camera calibration apparatus 60 includes an optimization unit 61.

The optimization unit 61 executes "optimization processing" of a rotation matrix, a translation vector, and two three-dimensional coordinates of each normal vector in an image plane calculated by the three-dimensional coordinate calculation unit 51. For example, in the "optimization processing", the optimization unit 61 calculates two "reprojection coordinates" obtained by projecting the above two three-dimensional coordinates of each normal vector in the image plane calculated by the three-dimensional coordinate calculation unit 51 onto the image plane using the rotation matrix and the translation vector output from the external parameter calculation unit 43. Then, the optimization unit 61 obtains the adjusted rotation matrix, the adjusted translation vector, and the adjusted two three-dimensional coordinates, which are expected to minimize a "re-projection error" which is an error between the two "re-projection coordinates" of each calculated normal vector in the image plane and the normalized start point coordinates and the normalized end point coordinates of each normal vector in the image plane. By doing so, the accuracy of the rotation matrix, the translation vector, and the two three-dimensional coordinates are improved.

For example, the optimization unit 61 may perform non-linear optimization based on the following Formula (11) using the above two three-dimensional coordinates for each normal vector in the image plane calculated by the three-dimensional coordinate calculation unit 51 and the rotation matrix and translation vector output from the external parameter calculation unit 43 as initial values.

[Formula 11]

$$\min_{\theta_x,\theta_z,x_i,y_i,z_i(i\in n)} \sum_{i=1}^{n} \|m_i - Proj(RM_i - r_3)\|^2 + \|m_i' - Proj(RM_i' - r_3)\|^2 \quad (11)$$

In this formula, Proj represents a function for dividing each of first and second components by a third component of a three-dimensional vector and converting them into a homogenized coordinate system, R represents the rotation matrix, $r_3$ represents the translation vector, $m_i$ and $m_i'$ represent the normalized start point coordinates and the normalized end point coordinates of the i-th normal vector in the image plane, $M_i$ and $M_i'$ represent the two three-dimensional coordinates about the start point and end point of the i-th normal vector in the image plane, $\theta_z$ represents a rotation angle around the first axis of the camera coordinate system, $\theta_x$ represents a rotation angle around a second axis, which is an axis other than the first axis of the camera coordinate system, and $x_i$, $y_i$, and $z_i$ represent the two three-dimensional coordinates about the start point and the end point of the i-th normal vector in the image plane, and // // represents a norm.

Formulas (8) to (10) are based on a linear simultaneous formula that minimize so-called algebraic errors. In addition, since the rotation matrix, the translation vector, and the three-dimensional coordinates are calculated in order, there is a possibility that errors may accumulate in the later stage. Therefore, by minimizing the so-called re-projection error represented by Formula (11), the error between parameters can be homogenized and a statistically optimum parameter can be calculated.

<Operation Example of Camera Calibration Apparatus>

Figure 8:
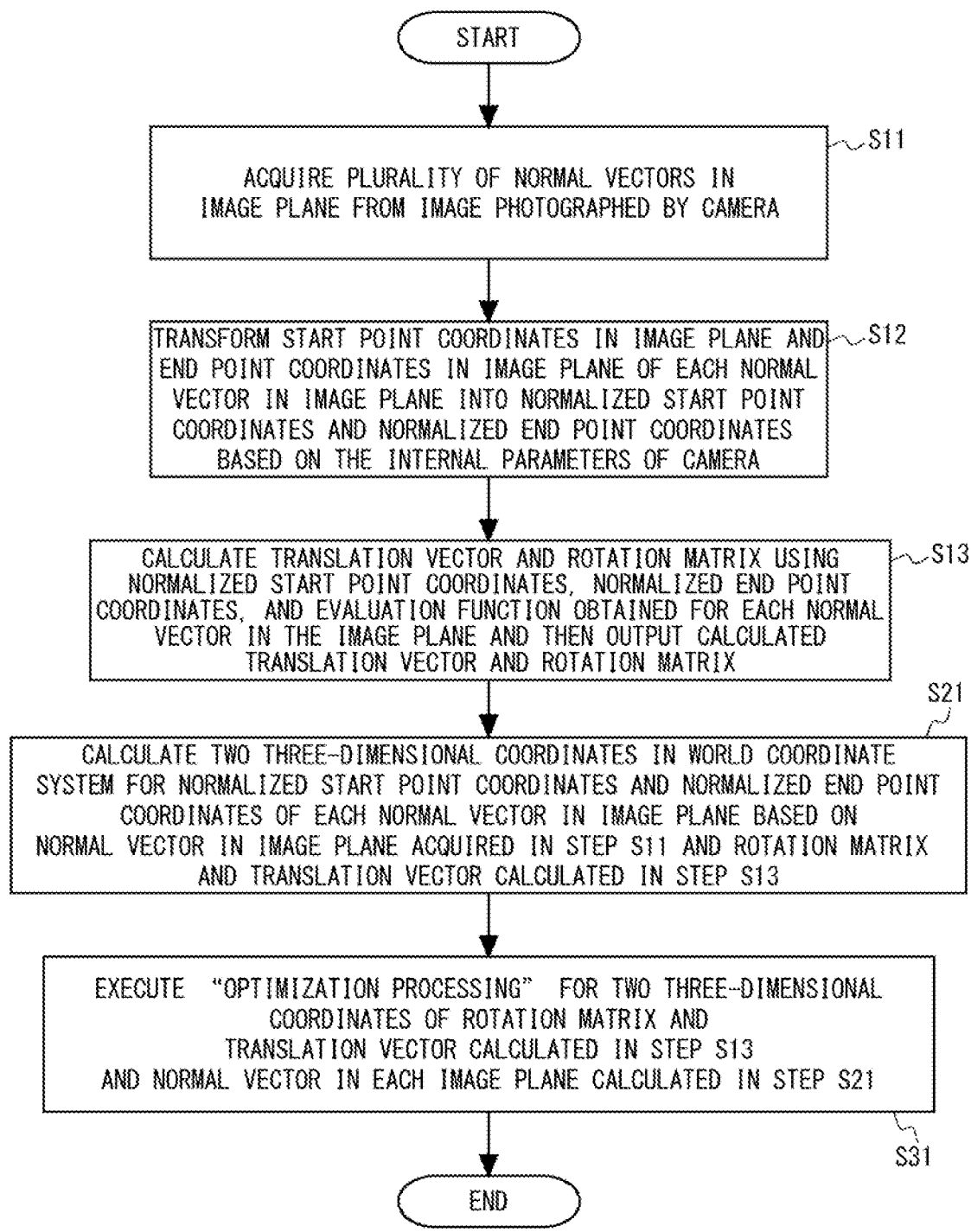
FIG. 8 is a flowchart showing an example of a processing operation of the camera calibration apparatus according to the fourth example embodiment.

FIG. 8 is a flowchart showing an example of the processing operation of the camera calibration apparatus according to the fourth example embodiment.

The optimization unit 61 executes the "optimization processing" for the rotation matrix and the translation vector calculated in Step S13 and the two three-dimensional coordinates of each normal vector in the image plane calculated in Step S21 (Step S31).

Modified Example

The camera system 1 according to the fourth example embodiment can be modified as follows.

In the above Formula (11), it is not necessary to optimize all the parameters. For example, as described in the modified example <2> of the third example embodiment, when there is a normal vector in the world coordinate space whose length is known, the three-dimensional coordinates of both end points of this normal vector may be a fixed value instead of a variable. This reduces the number of unknown variables, so that the optimization of Formula (11) can be performed more stably.

Other Example Embodiments

Figure 9:
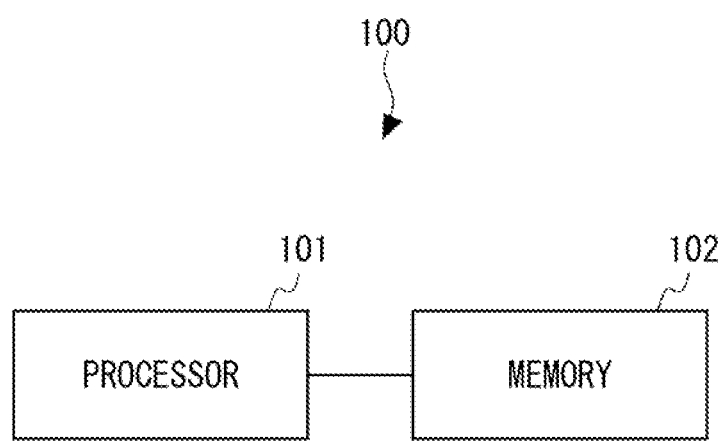
FIG. 9 is a diagram showing an example of a hardware configuration of the camera calibration apparatus.

FIG. 9 shows an example of a hardware configuration of the calibration apparatus. In FIG. 9, a calibration apparatus 100 includes a processor 101 and a memory 102. The processor 101 may be, for example, a microprocessor, a Micro Processing Unit (MPU), or a Central Processing Unit (CPU). The processor 101 may include a plurality of processors. The memory 102 is composed of a combination of a volatile memory and a non-volatile memory. The memory 102 may include a storage separated from the processor 101.

In this case, the processor 101 may access the memory 102 via an I/O interface (not shown).

Each of the camera calibration apparatuses 10, 40, 50, and 60 according to the first to fourth example embodiments, respectively, can have the hardware configuration shown in FIG. 9. The acquisition units 11 and 41, the normalized coordinate transformation units 12 and 42, the external parameter calculation units 13 and 43, the three-dimensional coordinate calculation unit 10, and optimization unit 40 of the camera calibration apparatuses 51, 61, 50, and 60 according to the first to fourth example embodiments may be implemented by the processor 101 reading and executing a program stored in the memory 102. The storage unit 44 may be implemented by the memory 102. The program can be stored and provided to the camera calibration apparatuses 10, 40, 50, and 60 using any type of non-transitory computer readable media. Examples of non-transitory computer readable media include magnetic storage media (such as floppy disks, magnetic tapes, hard disk drives, etc.), optical magnetic storage media (e.g. magneto-optical disks) of tangible storage media. Examples of non-transitory computer readable media further include CD-ROM (Read Only Memory), CD-R, CD-R/W. Examples of non-transitory computer readable media further include semiconductor memories. Semiconductor memories (such as mask ROM, PROM (Programmable ROM), EPROM (Erasable PROM), flash ROM, RAM (Random Access Memory), etc.). The program may be provided to the camera calibration apparatuses 10, 40, 50, and 60 using any type of transitory computer readable media. Examples of transitory computer readable media include electric signals, optical signals, and electromagnetic waves. Transitory computer readable media can provide the program to camera calibration apparatuses 10, 40, 50, and 60 via a wired communication line (e.g. electric wires, and optical fibers) or a wireless communication line.

Although the present disclosure has been described with reference to the example embodiments, the present disclosure is not limited to the above. The configuration and details of the present disclosure can be modified in various ways that will be understood by those skilled in the art within the scope of the disclosure.

The whole or part of the exemplary embodiments disclosed above can be described as, but not limited to, the following supplementary notes.

(Supplementary Note 1)

A camera calibration apparatus comprising:
an acquisition unit configured to acquire a plurality of normal vectors in an image plane corresponding to a plurality of normal vectors in a world coordinate space with respect to a reference plane in the world coordinate space, in the image plane of an image obtained by photographing the world coordinate space using a camera;
a normalized coordinate transformation unit configured to transform start point coordinates in the image plane and end point coordinates in the image plane, the start point coordinates in the image plane and the end point coordinates in the image plane being coordinates in the image plane, for a start point and an end point of each normal vector in the image plane acquired by the acquisition unit into normalized start point coordinates and normalized end point coordinates, the normalized start point coordinates and the normalized end point coordinates being normalized coordinates based on internal parameters of the camera; and
an external parameter calculation unit configured to calculate a translation vector and a rotation matrix for the camera using the normalized start point coordinates and the normalized end point coordinates obtained for each normal vector in the image plane by the normalized coordinate transformation unit and an evaluation function for overdetermining a rotation parameter around a normal line with respect to the reference plane in the world coordinate space.

(Supplementary Note 2)

The camera calibration apparatus according to Supplementary note 1, wherein
the external parameter calculation unit is configured to calculate, for the plurality of normal vectors in the image plane, a scalar triple product, which is an inner product of a cross product of a vector of the normalized start point coordinates and a vector of the normalized end point coordinates obtained for each normal vector in the image plane by the normalized coordinate transformation unit and the rotation vector around a first axis of the camera coordinate system in the rotation matrix for the camera,
the external parameter calculation unit is configured to calculate the desired rotation vector expected to minimize a sum of the plurality of calculated scalar triple products as the evaluation function and also calculates the rotation matrix based on the calculated desired rotation vector, and
the external parameter calculation unit is configured to output the calculated rotation matrix and the calculated desired rotation vector as a translation vector for the camera.

(Supplementary Note 3)

The camera calibration apparatus according to Supplementary note 2, wherein
the plurality of normal vectors in the image plane are a first normal vector in the image plane and a second normal vector in the image plane, and
the external parameter calculation unit is configured to calculate the rotation vector based on the following Formula:

[Formula 12]

$$r = \frac{(m_1 \times m_1') \times (m_2 \times m_2')}{\|(m_1 \times m_1') \times (m_2 \times m_2')\|}$$

In this formula r represents the rotation vector, $m_1$ and $m_1'$ represent the normalized start point coordinates and the normalized end point coordinates of the first normal vector in the image plane, $m_2$ and $m_2'$ represent the normalized start point coordinates and the normalized end point coordinates of the second normal vector in the image plane, and // // represents a norm.

(Supplementary Note 4)

The camera calibration apparatus according to Supplementary note 2 or 3, wherein
the camera coordinate system is defined such that the first axis of the camera coordinate system corresponds to an optical axis of the camera, an origin of the camera coordinate system is on the first axis of the world coordinate system, and a projection of the first axis of the camera coordinate system onto a plane formed by a second axis and a third axis of the world coordinate system overlaps the second axis of the world coordinate system.

(Supplementary Note 5)

The camera calibration apparatus according to Supplementary note 4, further comprising a three-dimensional coordinate calculation unit configured to calculate two relative three-dimensional coordinates in the world coordinate system about the normalized start point coordinates and the normalized end point coordinates of each normal vector in the image plane based on the plurality of normal vectors in the image plane acquired by the acquisition unit and the rotation matrix and the translation vector calculated by the external parameter calculation unit.

(Supplementary Note 6)

The camera calibration apparatus according to Supplementary note 5, wherein
the three-dimensional coordinate calculation unit is configured to calculate the two relative three-dimensional coordinates in the world coordinate system for the normalized start point coordinates and the normalized end point coordinates of each normal vector in the image plane based on the following formula.

[Formula 13]

$$\begin{bmatrix} m_i \times r_1 & m_i \times r_2 & 0 \\ m_i' \times r_1 & m_i' \times r_2 & m_i' \times r_3 \end{bmatrix} \begin{bmatrix} x_i \\ y_i \\ z_i \end{bmatrix} = \begin{bmatrix} m_i \times r_3 \\ m_i' \times r_3 \end{bmatrix}$$

In this formula, vectors $r_1$, $r_2$, and $r_3$ represent column vectors of the rotation matrix, $m_i$ and $m_i'$ represent the normalized start point coordinates and the normalized end point coordinates of an i-th normal vector in the image plane, and $[x_i, y_i, z_i]$ represents three-dimensional coordinates to be calculated.

(Supplementary Note 7)

The camera calibration apparatus according to Supplementary note 4, further comprising a three-dimensional coordinate calculation unit configured to calculate absolute two three-dimensional coordinates in the world coordinate system for the normalized start point coordinates and the normalized end point coordinates of each normal vector in the image plane based on the plurality of normal vectors in the image plane acquired by the acquisition unit, a rotation matrix and a translation vector calculated by the external parameter calculation unit, and a length of the normal vector in the world coordinate space corresponding to at least one of the plurality of vectors in the image plane or coordinates on the first axis of the world coordinate system of the origin of the camera coordinate system.

(Supplementary Note 8)

The camera calibration apparatus according to any one of Supplementary notes 5 to 7, further comprising an optimization unit configured to optimize the rotation matrix, the translation vector, and the two three-dimensional coordinates by obtaining the adjusted rotation matrix, the adjusted translation vector, and the two adjusted three-dimensional coordinates, which are expected to minimize a reprojection error, the reprojection error being an error between the two reprojection coordinates obtained by projecting the two three-dimensional coordinates of each normal vector in the image plane calculated by the three-dimensional coordinate calculation unit onto the image plane using the rotation matrix and the translation vector output from the external parameter calculation unit and the normalized start point coordinates and the normalized end point coordinates of each normal vector in the image plane.

(Supplementary Note 9)

The camera calibration apparatus according to Supplementary note 8, wherein
the optimization unit is configured to optimize the rotation matrix, the translation vector, and the two three-dimensional coordinates by performing nonlinear optimization using the two three-dimensional coordinates for each normal vector in the image plane calculated by the three-dimensional coordinate calculation unit and the rotation matrix and the translation vector output from the external parameter calculation unit as initial values based on the following Formula.

[Formula 14]

$$\min_{\theta_x, \theta_z, x_i, y_i, z_i (i \in n)} \sum_{k=1}^{n} \|m_i - Proj(RM_i - r_3)\|^2 + \|m_i' - Proj(RM_i' - r_3)\|^2$$

In this formula, Proj represents a function for dividing each of first and second components by a third component of a three-dimensional vector and converting them into a homogenized coordinate system, R represents the rotation matrix, $r_3$ represents the translation vector, $m_i$ and $m_i'$ represent the normalized start point coordinates and the normalized end point coordinates of the i-th normal vector in the image plane, $M_i$ and $M_i'$ represent the two three-dimensional coordinates about the start point and end point of the i-th normal vector in the image plane, $\theta_z$ represents a rotation angle around the first axis of the camera coordinate system, $\theta_x$ represents a rotation angle around a second axis, which is an axis other than the first axis of the camera coordinate system, and $x_i$, $y_i$, and $z_i$ represent the two three-dimensional coordinates about the start point and the end point of the i-th normal vector in the image plane, and and // // represents a norm.

(Supplementary Note 10)

A camera system comprising:
the camera calibration apparatus according to any one of Supplementary notes 1 to 9; and
an image supply apparatus configured to supply an image obtained by photographing the world coordinate space by the camera to the camera calibration apparatus.

(Supplementary Note 11)

A camera calibration method comprising:
acquiring a plurality of normal vectors in an image plane corresponding to a plurality of normal vectors in a world coordinate space with respect to a reference plane in the world coordinate space, in the image plane of an image obtained by photographing the world coordinate space using a camera;
transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and
calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

(Supplementary Note 12)

A non-transitory computer readable medium storing a program storing a program causing a camera calibration apparatus to execute processing of:

acquiring a plurality of normal vectors in an image plane corresponding to a plurality of normal vectors in a world coordinate space with respect to a reference plane in the world coordinate space, in the image plane of an image obtained by photographing the world coordinate space using a camera;

transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

REFERENCE SIGNS LIST

1 CAMERA SYSTEM
10 CAMERA CALIBRATION APPARATUS
11 ACQUISITION UNIT
12 NORMALIZED COORDINATE TRANSFORMATION UNIT
13 EXTERNAL PARAMETER CALCULATION UNIT
20 CAMERA
30 IMAGE SUPPLY APPARATUS
40 CAMERA CALIBRATION APPARATUS
41 ACQUISITION UNIT
42 NORMALIZED COORDINATE TRANSFORMATION UNIT
43 EXTERNAL PARAMETER CALCULATION UNIT
44 STORAGE UNIT
50 CAMERA CALIBRATION APPARATUS
51 THREE-DIMENSIONAL CALCULATION UNIT
60 CAMERA CALIBRATION APPARATUS
61 OPTIMIZATION UNIT

What is claimed is:

1. A camera parameter calculation apparatus comprising:
hardware including at least one processor and at least one memory;
an acquisition unit implemented at least by the hardware and that acquires a plurality of normal vectors in an image plane corresponding to a plurality of normal vectors in a world coordinate space with respect to a reference plane in the world coordinate space, in the image plane of an image obtained by photographing the world coordinate space using a camera;
a normalized coordinate transformation unit implemented at least by the hardware and that transforms start point coordinates in the image plane and end point coordinates in the image plane, the start point coordinates in the image plane and the end point coordinates in the image plane being coordinates in the image plane, for a start point and an end point of each normal vector in the image plane acquired by the acquisition unit into normalized start point coordinates and normalized end point coordinates, the normalized start point coordinates and the normalized end point coordinates being normalized coordinates based on internal parameters of the camera; and
an external parameter calculation unit implemented at least by the hardware and that calculates a translation vector and a rotation matrix for the camera using the normalized start point coordinates and the normalized end point coordinates obtained for each normal vector in the image plane by the normalized coordinate transformation unit and an evaluation function for overdetermining a rotation parameter around a normal line with respect to the reference plane in the world coordinate space.

2. The camera parameter calculation apparatus according to claim 1, wherein
the external parameter calculation unit is configured to calculate, for the plurality of normal vectors in the image plane, a scalar triple product, which is an inner product of a cross product of a vector of the normalized start point coordinates and a vector of the normalized end point coordinates obtained for each normal vector in the image plane by the normalized coordinate transformation unit and the rotation vector around a first axis of a camera coordinate system in the rotation matrix for the camera,
the external parameter calculation unit is configured to calculate the desired rotation vector expected to minimize a sum of the plurality of calculated scalar triple products as the evaluation function and also calculates the rotation matrix based on the calculated desired rotation vector, and
the external parameter calculation unit is configured to output the calculated rotation matrix and the calculated desired rotation vector as a translation vector for the camera.

3. The camera parameter calculation apparatus according to claim 2, wherein
the plurality of normal vectors in the image plane are a first normal vector in the image plane and a second normal vector in the image plane, and
the external parameter calculation unit is configured to calculate the rotation vector based on the following Formula:

$$r = \frac{(m_1 \times m_1') \times (m_2 \times m_2')}{\|(m_1 \times m_1') \times (m_2 \times m_2')\|}$$

where r represents the rotation vector, $m_1$ and $m_1'$ represent the normalized start point coordinates and the normalized end point coordinates of the first normal vector in the image plane, $m_2$ and $m_2'$ represent the normalized start point coordinates and the normalized end point coordinates of the second normal vector in the image plane, and // //represents a norm.

4. The camera parameter calculation apparatus according to claim 2, wherein
the camera coordinate system is defined such that the first axis of the camera coordinate system corresponds to an optical axis of the camera, an origin of the camera coordinate system is on a first axis of a world coordinate system of the world coordinate space, and a projection of the first axis of the camera coordinate system onto a plane formed by a second axis and a third axis of the world coordinate system overlaps the second axis of the world coordinate system.

5. The camera parameter calculation apparatus according to claim 4, further comprising a three-dimensional coordinate calculation unit implemented at least by the hardware and that calculates two relative three-dimensional coordinates in the world coordinate system about the normalized start point coordinates and the normalized end point coordinates of each normal vector in the image plane based on the plurality of normal vectors in the image plane acquired by the acquisition unit and the rotation matrix and the translation vector calculated by the external parameter calculation unit.

6. The camera parameter calculation apparatus according to claim 5, wherein the three-dimensional coordinate calculation unit is configured to calculate the two relative three-dimensional coordinates in the world coordinate system for the normalized start point coordinates and the normalized end point coordinates of each normal vector in the image plane based on the following formula:

$$\begin{bmatrix} m_i \times r_1 & m_i \times r_2 & 0 \\ m_i' \times r_1 & m_i' \times r_2 & m_i' \times r_3 \end{bmatrix} \begin{bmatrix} x_i \\ y_i \\ z_i \end{bmatrix} = \begin{bmatrix} m_i \times r_3 \\ m_i' \times r_3 \end{bmatrix}$$

where vectors $r_1$, $r_2$, and $r_3$ represent column vectors of the rotation matrix, $m_i$ and $m_i'$ represent the normalized start point coordinates and the normalized end point coordinates of an i-th normal vector in the image plane, and $[x_i, y_i, z_i]$ represents three-dimensional coordinates to be calculated.

7. The camera parameter calculation apparatus according to claim 4, further comprising a three-dimensional coordinate calculation unit implemented at least by the hardware and that calculates absolute two three-dimensional coordinates in the world coordinate system for the normalized start point coordinates and the normalized end point coordinates of each normal vector in the image plane based on the plurality of normal vectors in the image plane acquired by the acquisition unit, a rotation matrix and a translation vector calculated by the external parameter calculation unit, and a length of the normal vector in the world coordinate space corresponding to at least one of the plurality of vectors in the image plane or coordinates on the first axis of the world coordinate system of the origin of the camera coordinate system.

8. The camera parameter calculation apparatus according to claim 5, further comprising an optimization unit implemented at least by the hardware and that optimizes the rotation matrix, the translation vector, and the two three-dimensional coordinates by obtaining the adjusted rotation matrix, the adjusted translation vector, and the two adjusted three-dimensional coordinates, which are expected to minimize a reprojection error, the reprojection error being an error between the two reprojection coordinates obtained by projecting the two three-dimensional coordinates of each normal vector in the image plane calculated by the three-dimensional coordinate calculation unit onto the image plane using the rotation matrix and the translation vector output from the external parameter calculation unit and the normalized start point coordinates and the normalized end point coordinates of each normal vector in the image plane.

9. The camera parameter calculation apparatus according to claim 8, wherein the optimization unit is configured to optimize the rotation matrix, the translation vector, and the two three-dimensional coordinates by performing nonlinear optimization using the two three-dimensional coordinates for each normal vector in the image plane calculated by the three-dimensional coordinate calculation unit and the rotation matrix and the translation vector output from the external parameter calculation unit as initial values based on the following Formula:

$$\min_{\theta_x,\theta_z,x_i,y_i,z_i(i\in n)} \sum_{k=1}^{n} \|m_i - Proj(RM_i - r_3)\|^2 + \|m_i' - Proj(RM_i' - r_3)\|^2$$

where Proj represents a function for dividing each of first and second components by a third component of a three-dimensional vector and converting them into a homogenized coordinate system, R represents the rotation matrix, $r_3$ represents the translation vector, $m_i$ and $m_i'$ represent the normalized start point coordinates and the normalized end point coordinates of the i-th normal vector in the image plane, $M_i$ and $M_i'$ represent the two three-dimensional coordinates about the start point and end point of the i-th normal vector in the image plane, $\theta_z$ represents a rotation angle around the first axis of the camera coordinate system, $\theta_x$ represents a rotation angle around a second axis, which is an axis other than the first axis of the camera coordinate system, and $x_i$, $y_i$, and $z_i$ represent the two three-dimensional coordinates about the start point and the end point of the i-th normal vector in the image plane, and and // //represents a norm.

10. A camera system comprising:

the camera parameter calculation apparatus according to claim 1; and an image supply apparatus configured to supply an image obtained by photographing the world coordinate space by the camera to the camera parameter calculation apparatus.

11. A camera parameter calculation method comprising:

acquiring a plurality of normal vectors in an image plane corresponding to a plurality of normal vectors in a world coordinate space with respect to a reference plane in the world coordinate space, in the image plane of an image obtained by photographing the world coordinate space using a camera;

transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

12. A non-transitory computer readable medium storing a program storing a program causing a camera parameter calculation apparatus to execute processing of:
   acquiring a plurality of normal vectors in an image plane corresponding to a plurality of normal vectors in a world coordinate space with respect to a reference plane in the world coordinate space, in the image plane of an image obtained by photographing the world coordinate space using a camera;
   transforming start point coordinates in the image plane and end point coordinates in the image plane, the start point coordinates in the image plane and the end point coordinates in the image plane being coordinates in the image plane, for a start point and an end point of each acquired normal vector in the image plane into normalized start point coordinates and normalized end point coordinates, the normalized start point coordinates and the normalized end point coordinates being normalized coordinates based on internal parameters of the camera; and
   calculating a translation vector and a rotation matrix for the camera using the normalized start point coordinates and the normalized end point coordinates obtained for each normal vector in the image plane and an evaluation function for overdetermining a rotation parameter around a normal line with respect to the reference plane in the world coordinate space and then outputting the translation vector and the rotation matrix.

* * * * *